April 3, 1951   O. B. COONS ET AL   2,547,813
CONDUCTOR PIPE HANGER
Filed May 22, 1947
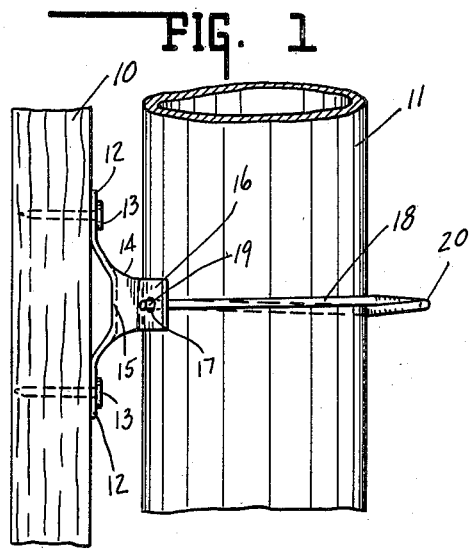
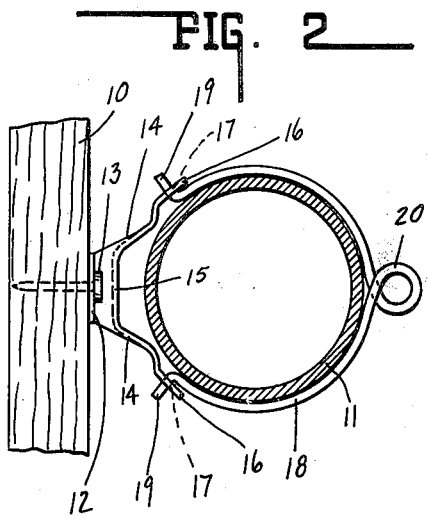
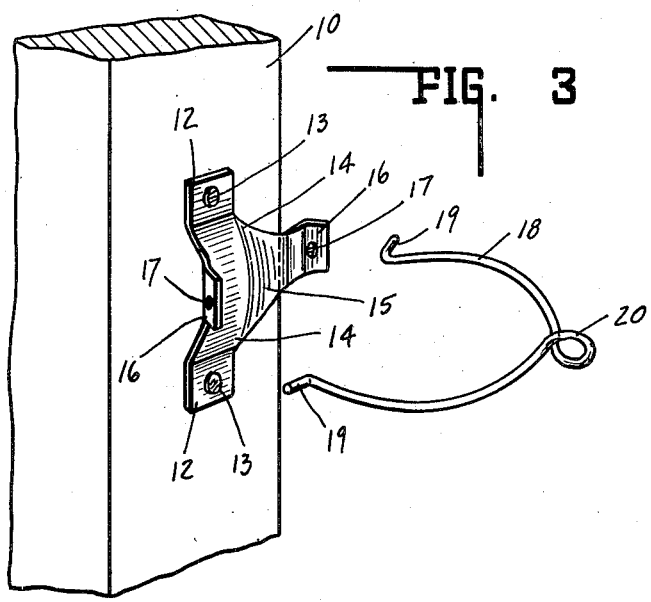
Inventors.
OMER B. COONS.
HERBERT P. DUKES.
By Lockwood, Goldsmith & Galt.
Attorneys.

Patented Apr. 3, 1951

2,547,813

UNITED STATES PATENT OFFICE 2,547,813

CONDUCTOR PIPE HANGER

Omer B. Coons and Herbert P. Dukes,
Crawfordsville, Ind.

Application May 22, 1947, Serial No. 749,746

4 Claims. (Cl. 248—74)

This invention relates to a conductor pipe hanger for securing a conductor pipe or downspout to the side of a building or similar wall structure.

It is the purpose of this invention to provide such a pipe hanger which may be economically produced from sheet metal and wire such as may comprise waste material accumulated by manufacturers of sheet metal and wire products, which will be simple of installation as well as permanent and durable, and which will securely clamp the conductor pipe without strain upon the means for securing it to the building. Furthermore, the structure is such that it supports the conductor pipe in spaced relation to the building so that both the adjacent surface of the building and pipe may be conveniently painted with a protective coating.

The invention particularly resides in the sheet metal bracket which may be a simple stamping formed with a saddle seat conforming to the curvature of the pipe and spaced from the building wall, against which the pipe is clamped by a wire conveniently hooked to the bracket at its ends and having a tension twist loop for inserting a tool and twisting it to clamp the pipe under tension to the saddle seat of the bracket.

The full nature of the invention will be understood from the accompanying drawings and the following description and claims.

Fig. 1 is a side elevation showing a portion of the conductor pipe with the hanger supporting it upon a wall.

Fig. 2 is a plan view of the hanger showing the pipe in cross section clamped thereby.

Fig. 3 is an exploded perspective view of the pipe hanger with the bracket portion secured to the wall of the building, with the wire clamp removed from the bracket.

In the drawings there is shown a wall 10 such as the outer wall of a building or the like to which the conductor pipe 11 is to be secured. Mounted at spaced intervals on the building there are hangers for supporting and securing the pipe thereto, which hangers are of the following construction.

The conductor pipe hanger includes a bracket, preferably stamped from sheet metal, with vertically spaced supporting plates 12 adapted to be secured in vertical alignment with the wall of the building by the screws or nails 13. The vertical spacing of the plates 12 is preferably such as to permit them to span a brick or the like and be anchored by the screws or nails 13 extending into the mortise between bricks, or alternately in a wooden structure as shown. Converging outwardly from the plates there are tapered web portions 14 terminating in a bracket saddle seat 15 having a curvature substantially that of the conductor pipe to be seated therein. Thus, the saddle seat 15 and, therefore, the pipe 11 is supported in spaced relation to the wall of the building by reason of the outwardly extending webs 14. The saddle seat terminates at each end in a pair of opposed wings 16 extending at right angles to the plates 12 which are bent or formed to a different curvature than the saddle seat and outwardly therefrom so as to be spaced from the surface of the conductor pipe seated therein, each of said wings being provided with an aperture 17.

For association with the bracket there is a wire clamp 18 formed to the general contour of the conductor pipe and substantially U-shaped in form with each leg thereof terminating in outwardly and reversely extending angular hooks 19 adapted to be inserted through and locked in the apertures 17 of the wings 16. Intermediate the hooked ends of the wire clamp there is provided a tension twist look 20 of a dimension just large enough to insert a twisting tool such as a rod, bolt or the like.

In mounting the hanger, the bracket is first secured to the building wall as shown in Fig. 3; whereupon the pipe is seated to bear against the saddle seat 15. One of the angular hooks 19 is then inserted outwardly through the aperture 17 of one of the wings 16 with the wire clamp embracing the positioned pipe, whereupon the opposed hook 19 is outwardly inserted and locked in the opposite wing 16. With the wire clamp thus locked with the bracket and about the pipe, a suitable tool is inserted in the tension twist loop 20 and turned so as to further twist the loop until the wire clamp is drawn about the pipe under tension to thereby securely clamp it against the saddle seat of the bracket. With the hooks 19 extending outwardly through the wings 16, and the pipe securely clamped, said hooks will be locked thereby against displacement.

From the foregoing, it will be observed that the hanger consists of only two parts, a sheet metal stamping of which the bracket is formed and the curved and looped wire clamp. The bracket supports the pipe in spaced relation to the wall so that the back side can be painted or coated, as well as the adjacent portion of the wall. When the loop 20 is twisted, it firmly clamps the pipe against the bracket without exerting any strain on the connection between the bracket and the wall.

We claim:

1. A pipe hanger comprising a bracket body having a seat portion conforming substantially to the shape of one side of the pipe to be accommodated, wings projecting from the sides of said seat portion and laterally aligned with one another, each wing having an opening therein, anchoring plates integral with said bracket and projecting outwardly from the ends of said seat portion, an open clamping wire conforming substantially to the lateral contour of said pipe, hooks at the ends of said wire to engage and lock in said openings, and a tensioning twist loop in said wire intermediate the ends thereof.

2. A pipe hanger comprising a bracket body having a seat portion conforming substantially to the shape of one side of the pipe to be accommodated, wings projecting from the sides of said seat portion and laterally aligned with one another, each wing having an opening therein, anchoring plates integral with said bracket and projecting outwardly from the ends of said seat portion and disposed outwardly beyond the plane of the latter, said anchoring plates being disposed parallel to the axis of the pipe, a clamping member conforming substantially to the lateral contour of said pipe, and hook members at the ends of said clamping wire to engage in said wing openings.

3. A conductor pipe hanger comprising a sheet metal stamped bracket provided with vertically arranged and inwardly extending supporting plates to be secured to a wall in vertically spaced relation and an intermediately formed saddle seat spaced therefrom by said plates and curved to substantially the curvature of the pipe, said saddle seat terminating at each side in an apertured locking wing extending at right angles to the vertically arranged plates and bent outwardly from a continuation of its curvature to partially embrace the pipe, a U-shaped clamping wire terminating in outwardly and reversely extending hooks adapted to be hooked into the respective apertures of said locking wings, and a tensioning twist loop formed in said clamping wire for receiving a twisting tool adapted to draw said pipe against said saddle seat under tension to secure said pipe in locking relation with the outwardly extending hooks and prevent their displacement.

4. A pipe hanger comprising a bracket body adapted to be secured to a wall to receive one side of a pipe, wings projecting from the opposite sides of said bracket and in lateral alignment with one another, said wings having apertures therein, the distance between said wings being less than the diameter of said pipe, a U-shaped resilient clamping wire to loosely embrace the greater part of the lateral dimension of said pipe, out-turned hooks at the free ends of said clamping wire to engage in said apertures, and a tensioning loop in said wire intermediate its ends adapted when twisted to draw the tensioning wire in tight clamping engagement with said pipe throughout the greater part of its circumference.

OMER B. COONS.
HERBERT P. DUKES.

REFERENCES CITED

The following references are of record in the file of this patent:

UNITED STATES PATENTS

| Number | Name | Date |
|---|---|---|
| 619,915 | Wentworth | Feb. 21, 1899 |
| 845,578 | Ross | Feb. 26, 1907 |
| 928,711 | Taft | July 20, 1909 |
| 1,125,064 | Connell | Jan. 19, 1915 |
| 1,429,776 | Robinson | Sept. 19, 1922 |

FOREIGN PATENTS

| Number | Country | Date |
|---|---|---|
| 7,239 | Great Britain | of 1885 |